US008397094B2

(12) United States Patent
Tsuiki et al.

(10) Patent No.: US 8,397,094 B2
(45) Date of Patent: Mar. 12, 2013

(54) NODE-TO-NODE SYNCHRONIZING APPARATUS, NODE-TO-NODE SYNCHRONIZING METHOD, AND COMPUTER PRODUCT

(75) Inventors: Jun Tsuiki, Kawasaki (JP); Hiroyuki Oka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 611 days.

(21) Appl. No.: 12/461,019

(22) Filed: Jul. 29, 2009

(65) Prior Publication Data

US 2010/0111115 A1 May 6, 2010

(30) Foreign Application Priority Data

Oct. 31, 2008 (JP) .................................. 2008-282249

(51) Int. Cl.
*G06F 1/04* (2006.01)
*G06F 1/12* (2006.01)
(52) U.S. Cl. ......... 713/375; 713/400; 713/500; 707/610
(58) Field of Classification Search .................. 713/375, 713/400, 500; 707/610
See application file for complete search history.

(56) References Cited

U.S. PATENT DOCUMENTS

| | | | | |
|---|---|---|---|---|
| 5,797,004 A | * | 8/1998 | Lindholm et al. | 718/104 |
| 7,624,117 B2 | * | 11/2009 | Fuerst et al. | 1/1 |
| 2001/0032257 A1 | * | 10/2001 | Wells et al. | 709/223 |

FOREIGN PATENT DOCUMENTS

| | | |
|---|---|---|
| JP | 61-136157 A | 6/1986 |
| JP | 1-241662 A | 9/1989 |
| JP | 10-083379 | 3/1998 |
| JP | 2001-051966 | 2/2001 |
| JP | 2004-030312 | 1/2004 |
| JP | 2005-316679 | 11/2005 |

OTHER PUBLICATIONS

Japanese Office Action mailed Nov. 13, 2012 for corresponding Japanese Application No. 2008-282249, with English-language Translation.

* cited by examiner

*Primary Examiner* — Kim Huynh
*Assistant Examiner* — Michael J Brown
(74) *Attorney, Agent, or Firm* — Fujitsu Patent Center

(57) ABSTRACT

A node-to-node synchronizing apparatus includes an information generating unit. Before receiving a synchronization request for synchronization, the information generating unit receives, from each process in each computing node, a mask generation request requesting to generate process location information (mask) indicating the location of processes that participate in synchronization. The information generating unit then automatically generates the process location information based on the mask generation request.

4 Claims, 13 Drawing Sheets

FIG.3

| COMMUNICATION CONTEXT TABLE ||| 
| --- | --- | --- |
| index (CORRESPONDING TO COMMUNICATION ID) | NODE ID | INTRA NODE COMMUNICATION ID |
| 00 | 00 | 0x1000 |
| 01 | — | — |
| 02 | 02 | 0x1010 |

| MASK INFORMATION TABLE | | | | |
| --- | --- | --- | --- | --- |
| | index03 (CORRESPONDING TO COMMUNICATION ID=03) | index02 (CORRESPONDING TO COMMUNICATION ID=02) | index01 (CORRESPONDING TO COMMUNICATION ID=01) | index00 (CORRESPONDING TO COMMUNICATION ID=00) |
| MASK (0/1) | 0 | 0 | 0 | 0 |
| SYNCHRO-NIZATION STATE (0/1) | 0 | 0 | 0 | 0 |
| COUNTER (NUMBER) | 0 ||||

| MASK | 0 | 0 | 0 | 0 |
|---|---|---|---|---|
| SYNCHRONIZATION STATE | 0 | 0 | 0 | 0 |
| COUNTER | 0 ||||

(2)

| MASK | 0 | 0 | 0 | 1 |
|---|---|---|---|---|
| SYNCHRONIZATION STATE | 0 | 0 | 0 | 0 |
| COUNTER | 1 ||||

(3)

| MASK | 0 | 1 | 0 | 1 |
|---|---|---|---|---|
| SYNCHRONIZATION STATE | 0 | 0 | 0 | 0 |
| COUNTER | 2 ||||

(4)

| MASK | 0 | 1 | 0 | 1 |
|---|---|---|---|---|
| SYNCHRONIZATION STATE | 0 | 1 | 0 | 0 |
| COUNTER | 2 ||||

(5)

| MASK | 0 | 1 | 0 | 1 |
|---|---|---|---|---|
| SYNCHRONIZATION STATE | 0 | 1 | 0 | 1 |
| COUNTER | 2 ||||

FIG.8

MASK INFORMATION TABLE

| | index03 (CORRESPONDING TO SET ID=03) | | | | index02 (CORRESPONDING TO SET ID=02) | index01 (CORRESPONDING TO SET ID=01) | index00 (CORRESPONDING TO SET ID=00) |
|---|---|---|---|---|---|---|---|
| | COMMUNI-CATION ID=03 | COMMUNI-CATION ID=02 | COMMUNI-CATION ID=01 | COMMUNI-CATION ID=00 | | | |
| MASK (0/1) | 0 | 0 | 0 | 0 | | | |
| SYNCHRONIZATION STATE (0/1) | 0 | 0 | 0 | 0 | | | |
| COUNTER (NUMBER) | 0 | | | | | | |

|  | PORT 1 | | | | PORT 2 | | | | PORT-TO-PORT | |
| --- | --- | --- | --- | --- | --- | --- | --- | --- | --- | --- |
| MASK | 0 | 0 | 0 | 0 | 0 | 0 | 0 | 0 | 0 | 0 |
| SYNCHRONIZATION STATE | 0 | 0 | 0 | 0 | 0 | 0 | 0 | 0 | 0 | 0 |
| COUNTER | - | | | | - | | | | 0 | |

(2)

|  | PORT 1 | | | | PORT 2 | | | | PORT-TO-PORT | |
| --- | --- | --- | --- | --- | --- | --- | --- | --- | --- | --- |
| MASK | 0 | 0 | 0 | 1 | 0 | 0 | 0 | 0 | 0 | 1 |
| SYNCHRONIZATION STATE | 0 | 0 | 0 | 0 | 0 | 0 | 0 | 0 | 0 | 0 |
| COUNTER | - | | | | - | | | | 1 | |

(3)

|  | PORT 1 | | | | PORT 2 | | | | PORT-TO-PORT | |
| --- | --- | --- | --- | --- | --- | --- | --- | --- | --- | --- |
| MASK | 0 | 0 | 0 | 1 | 0 | 1 | 0 | 0 | 1 | 1 |
| SYNCHRONIZATION STATE | 0 | 0 | 0 | 0 | 0 | 0 | 0 | 0 | 0 | 0 |
| COUNTER | - | | | | - | | | | 2 | |

(4)

|  | PORT 1 | | | | PORT 2 | | | | PORT-TO-PORT | |
| --- | --- | --- | --- | --- | --- | --- | --- | --- | --- | --- |
| MASK | 1 | 0 | 0 | 1 | 0 | 1 | 0 | 0 | 1 | 1 |
| SYNCHRONIZATION STATE | 0 | 0 | 0 | 0 | 0 | 0 | 0 | 0 | 0 | 0 |
| COUNTER | - | | | | - | | | | 3 | |

|  | PORT 1 | | | | PORT 2 | | | | PORT-TO-PORT | |
|---|---|---|---|---|---|---|---|---|---|---|
| MASK | 1 | 0 | 0 | 1 | 0 | 1 | 0 | 0 | 1 | 1 |
| SYNCHRONIZATION STATE | 0 | 0 | 0 | 0 | 0 | 1 | 0 | 0 | 1 | 0 |
| COUNTER | - | | | | - | | | | 3 | |

(6)

|  | PORT 1 | | | | PORT 2 | | | | PORT-TO-PORT | |
|---|---|---|---|---|---|---|---|---|---|---|
| MASK | 1 | 0 | 0 | 1 | 0 | 1 | 0 | 0 | 1 | 1 |
| SYNCHRONIZATION STATE | 1 | 0 | 0 | 0 | 0 | 1 | 0 | 0 | 1 | 0 |
| COUNTER | - | | | | - | | | | 3 | |

(7)

|  | PORT 1 | | | | PORT 2 | | | | PORT-TO-PORT | |
|---|---|---|---|---|---|---|---|---|---|---|
| MASK | 1 | 0 | 0 | 1 | 0 | 1 | 0 | 0 | 1 | 1 |
| SYNCHRONIZATION STATE | 1 | 0 | 0 | 1 | 0 | 1 | 0 | 0 | 1 | 1 |
| COUNTER | - | | | | - | | | | 3 | |

(8)

|  | PORT 1 | | | | PORT 2 | | | | PORT-TO-PORT | |
|---|---|---|---|---|---|---|---|---|---|---|
| MASK | 1 | 0 | 0 | 1 | 0 | 1 | 0 | 0 | 1 | 1 |
| SYNCHRONIZATION STATE | 0 | 0 | 0 | 0 | 0 | 0 | 0 | 0 | 0 | 0 |
| COUNTER | - | | | | - | | | | 3 | |

NODE-TO-NODE SYNCHRONIZING APPARATUS, NODE-TO-NODE SYNCHRONIZING METHOD, AND COMPUTER PRODUCT

CROSS-REFERENCE TO RELATED APPLICATION

This application is based upon and claims the benefit of priority of the prior Japanese Patent Application No. 2008-282249, filed on Oct. 31, 2008, the entire contents of which are incorporated herein by reference.

FIELD

The embodiments discussed herein are directed to a node-to-node synchronizing apparatus, a node-to-node synchronizing method, and a computer product.

BACKGROUND

To accelerate synchronization among processors in parallel programs, hardware synchronization mechanisms have been used. Reference may be had to, for example, Japanese Laid-open Patent Publication No. 2005-316679. Prior to synchronization operation, hardware synchronization mechanisms must be set up to reflect the location of processors that participate in synchronization. FIG. 16 is a diagram for explaining a conventional hardware synchronization mechanism. An apparatus is explained that accelerates synchronization among processors in a node.

As depicted in FIG. 16, the apparatus that accelerates synchronization among processors in a node is configured of four processors 50 (A to D), a mask-information retaining unit 60, a state retaining unit 70, and a processor-to-processor synchronization control unit 80. The mask-information retaining unit 60 is a 4-bit register corresponding to four processors, retaining information for specifying any processor 50 that participates in synchronization. The state retaining unit 70 is a 4-bit register corresponding to four processors, retaining information for specifying any processor 50 that makes a synchronization request. Upon receiving a synchronization request from any processor 50, the processor-to-processor synchronization control unit 80 updates the information in the state retaining unit 70. Also, the processor-to-processor synchronization control unit 80 compares the state retaining unit 70 and the mask-information retaining unit 60 to detect completion of synchronization, and then notifies the processor 50 of the completion.

Next, the case is explained where a process on the processor A and a process on the processor C participate in synchronization.

(1) Setting a Mask and Initializing a Synchronization State

The information in the mask-information retaining unit 60 is initialized to "0101", reflecting the location of the processes on the processors A and C. On the other hand, the information in the state retaining unit 70 is initialized to "0000".

(2) Processor A Issues a Synchronization Request

From the processor A to the processor-to-processor synchronization control unit 80, a synchronization request is issued. The processor-to-processor synchronization control unit 80 updates the state retaining unit 70 from "0000" to "0001", by changing the value of a status bit corresponding to the processor A. Then, the processor-to-processor synchronization control unit 80 compares the updated information "0001" in the state retaining unit 70 and the information "0101" in the mask-information retaining unit 60 to determine that synchronization has not yet ended.

(3) Processor C Issues a Synchronization Request

From the processor C to the processor-to-processor synchronization control unit 80, a synchronization request is issued. The processor-to-processor synchronization control unit 80 updates the state retaining unit 70 from "0001" to "0101", by changing the value of a status bit corresponding to the processor C. The processor-to-processor synchronization control unit 80 then compares the updated information "0101" in the state retaining unit 70 and the information "0101" in the mask-information retaining unit 60 to determine that synchronization has ended.

(4) Processors are Notified of Completion

Form the processor-to-processor synchronization control unit 80, according to the mask-information retaining unit 60, the processor A and the processor C that participate in synchronization are notified of completion of synchronization.

As described above, a determination as to whether synchronization of processes that participate in synchronization has been completed is made by comparing the information in the mask-information retaining unit 60 and the information in the state retaining unit 70. Therefore, to determine the completion correctly, process location information (mask) indicative of in which processor the processes that participate in synchronization must be initialized to the value reflecting the location of processors before a synchronization request is issued.

Meanwhile, in recent years, a system that executes parallel programs becomes large in size, including several hundreds to several thousands of nodes. For this reason, for example, when process location information (mask) about processes that participate in synchronization is generated at one of nodes that execute parallel programs, a burden of cost in transmission and reception for exchanging information among nodes is disadvantageously enormous.

In parallel programs, such as message passing interface (MPI), synchronization in an arbitrary subset of processes in a job and dynamically changing a set of processes for synchronization in a job are allowed. However, in the conventional hardware synchronization mechanism described above, it is in practice difficult to handle such operations for synchronization because process location information needs to be set in advance in the mask-information retaining unit 60 before a synchronization request is issued.

SUMMARY

According to an aspect of an embodiment, an apparatus includes an information generating unit. The information generating unit receives, from each process in each computing node, a mask generation request requesting to generate process location information indicating the location of processes that participate in synchronization. The information generating unit automatically generates the process location information based on the mask generation request.

According to another aspect of an embodiment, a method includes: receiving, from each process in each computing node, a mask generation request requesting to generate process location information indicating the location of processes that participate in synchronization; and automatically generating the process location information based on the mask generation request.

According to still another aspect of an embodiment, a computer readable storage medium stores instructions that, when executed by a computer, causes the computer to perform the above method.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is an example diagram of the structure of a communication context table according to the first embodiment;

FIG. 4 is an example diagram of the structure of a mask information table according to the first embodiment;

FIG. 5 is an example diagram for explaining information transition in the mask information table according to the first embodiment;

FIG. 8 is an example diagram of the structure of a mask information table according to the second embodiment;

FIGS. 10 and 11 are example diagrams for explaining information transition in a mask information table according to the third embodiment;

DESCRIPTION OF EMBODIMENTS

Exemplary embodiments of the invention will be explained with reference to the accompanying drawings.

[a] First Embodiment

A node-to-node synchronizing apparatus according to a first embodiment participates in synchronization among processors in a computing node. More specifically, before receiving a synchronization request for synchronization, the node-to-node synchronizing apparatus of the first embodiment receives, from each process in the computing node that participates in synchronization, a mask generation request requesting to generate process location information (mask) indicating the location of processes that participate in synchronization. Using each mask generation request issued from each process that participates in synchronization, the node-to-node synchronizing apparatus of the first embodiment automatically generates the process location information (mask). Thus, location information (mask) of processes that participate in synchronization can be automatically generated at low cost, and further, can be dynamically changed in a job.

Figure 1:
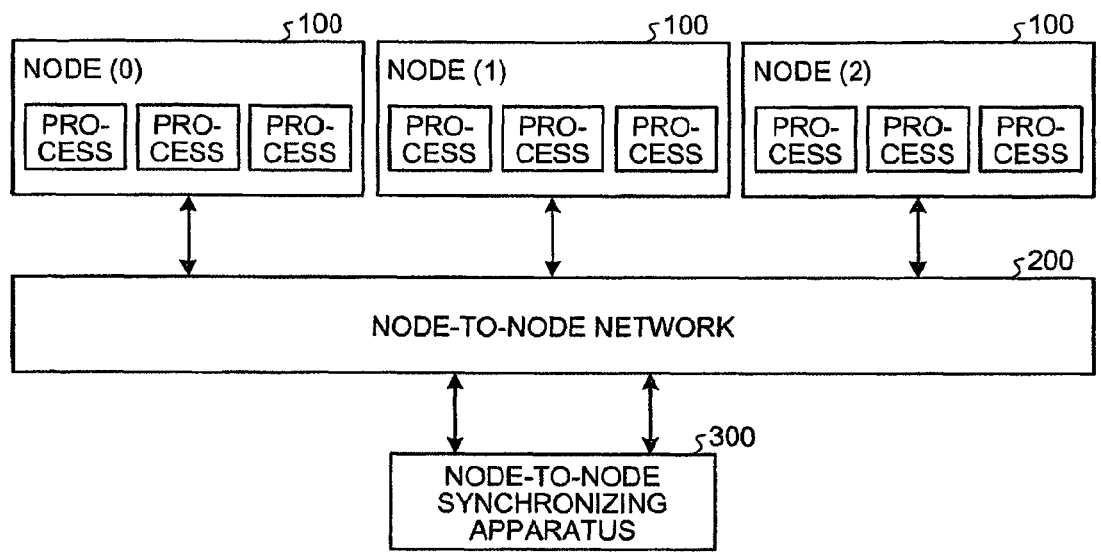
FIG. 1 is an example diagram of the configuration of a system according to a first embodiment.
Figure 2:
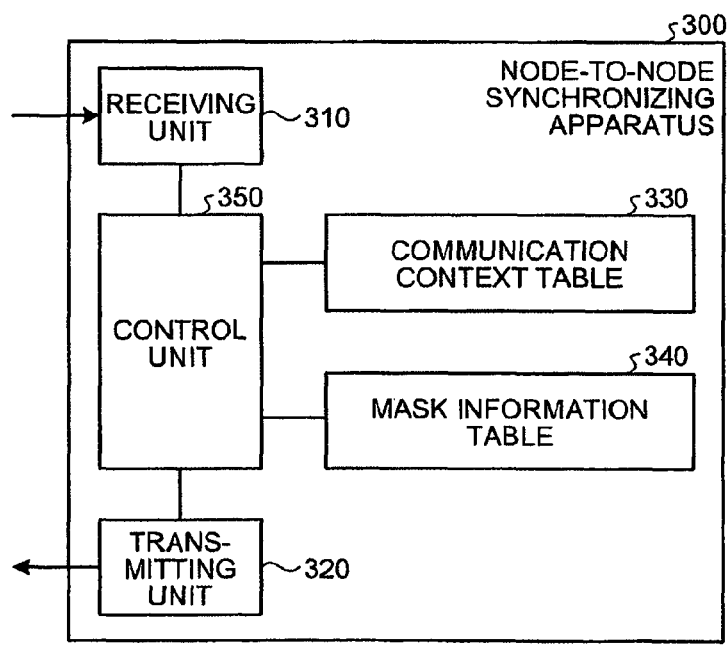
FIG. 2 is an example block diagram of a node-to-node synchronizing apparatus according to the first embodiment.

FIG. 1 is a diagram of the configuration of a system according to the first embodiment. FIG. 2 is a block diagram of a node-to-node synchronizing apparatus 300 according to the first embodiment.

As depicted in FIG. 1, the node-to-node synchronizing apparatus 300 according to the first embodiment is connected to each computing node 100 (node (0) to node (2)) in a communicable state via a node-to-node network 200.

As depicted in FIG. 2, the node-to-node synchronizing apparatus 300 includes a receiving unit 310, a transmitting unit 320, a communication context table 330, a mask information table 340, and a control unit 350. The receiving unit 310 receives via the node-to-node network 200 a mask generation request and a synchronization request transmitted from each computing node 100. The transmitting unit 320 transmits a mask generation response and a synchronization response received from the control unit 350 to each computing node 100.

The communication context table 330 is a table that stores information required for communications with the computing nodes 100. Specifically, as depicted in FIG. 3, in association with index, a node identifier (ID) unique to a computing node and an intra node communication ID unique to a process in the computing node are stored in advance. FIG. 3 illustrates an example of the structure of the communication context table according to the first embodiment.

The mask information table 340 stores, for example, process location information (mask) indicating the location of processes that participate in synchronization. Specifically, as depicted in FIG. 4, mask, synchronization state, and counter are stored for every information identical to each index in the communication context table 330. In an initial state, all pieces of information in the mask information table 340 indicate "0". FIG. 4 illustrates an example of the structure of the mask information table according to the first embodiment.

Here, each piece of information in the mask information table 340 is explained. The mask contains process location information indicating the location of processes that participate in synchronization, and is updated in response to a mask generation request for generation of process location information ("0" indicates non-participation in synchronization, whilst "1" indicates participation). The synchronization state contains information indicating a state of receiving a synchronization request for synchronization, and is updated in response to the receipt of a synchronization request ("0" indicates "have not received the synchronization request yet", whilst "1" indicates "have received the synchronization request"). The counter contains information for use in determining whether a mask generation request has been received from all processes that participate in synchronization, and is incremented by one every time a mask generation request is received.

The control unit 350 includes a predetermined control program, programs in which various process procedures are defined, and an internal memory for storing necessary data and, with these components, performs various processes.

Specifically, upon receiving a mask generation request from a process that participates in synchronization, the control unit 350 specifies an index corresponding to the communication ID contained in the mask generation request. Based on the index specified from the communication ID contained in the mask generation request, the control unit 350 updates a corresponding portion of a mask and a counter in the mask information table 340.

With reference to FIG. 5, the operation of the control unit 350 is explained below, in which, among the computing nodes 100, a process in the node (0) and a process in the node (2) participate in synchronization. FIG. 5 is a diagram for explaining information transition in the mask information table according to the first embodiment. Upon receiving a mask generation request from a process in the node (0) that participates in synchronization, the control unit 350 updates a corresponding portion (right end) of the mask in the mask information table 340 from "0" to "1" based on "index00" corresponding to "communication ID=00" contained in the mask generation request. Furthermore, the control unit 350 increments the counter in the mask information table 340 by "1" (see (2) in FIG. 5).

The control unit 350 then determines whether a mask generation request has been received from all processes that participate in synchronization. Specifically, from the mask generation request received from the node (0), the control unit 350 obtains the number of processes "2" that participate in synchronization, and compares the obtained number with the counter value "1" in the mask information table 340. As a result of comparison, the number of processes "2" obtained from the mask generation request and the counter value "1" in the mask information table 340 do not match each other, and therefore it is determined that a mask generation request has not been received from all processes that participate in synchronization. The control unit 350 then waits for receiving the remaining mask generation request.

After receiving a mask generation request from the node (0), upon receiving a mask generation request from the node (2), as with the case of receiving a mask generation request from the node (0), the control unit 350 updates the mask and the counter in the mask information table 340. That is, based on "index02" corresponding to "communication ID=02" contained in the mask generation request received from a process in the node (2), the control unit 350 updates a corresponding portion (second from left) of the mask in the mask information table 340 from "0" to "1". Furthermore, the control unit 350 increments the counter in the mask information table 340 by "1" (see (3) in FIG. 5).

Then, as with the case of receiving a mask generation request from the node (0), the control unit 350 determines whether a mask generation request has been received from all processes that participate in synchronization. That is, from the mask generation request received from the node (2), the control unit 350 obtains the number of processes "2" that participate in synchronization, and compares the number with the counter value "2" in the mask information table 340. As a result of comparison, the number of processes "2" that participate in synchronization and the counter value "2" in the mask information table 340 match each other, and therefore it is determined that a mask generation request has been received from all processes that participate in synchronization.

Then, from the communication context table 330, the control unit 350 obtains information for communicating with the node (0) and the node (2), and transmits to the node (0) and the node (2) a mask generation response indicating the completion of mask generation. Specifically, based on the index corresponding to the communication ID contained in the mask generation request received from each of the processes in the node (0) and the node (2), from the communication context table 330, the control unit 350 obtains a node ID and an intra node communication ID for communicating with each of the processes in the node (0) and the node (2).

After transmitting the mask generation response, the control unit 350 waits for receiving a synchronization request from each of the node (0) and the node (2). Then, upon receiving a synchronization request from the process in the node (2), based on "index02" corresponding to "communication ID=02" contained in the synchronization request, the control unit 350 updates a corresponding portion (second from left) of the synchronization state in the mask information table 340 from "0" to "1" (see (4) in FIG. 5).

After updating the synchronization state, the control unit 350 determines whether a synchronization request has been received from all processes that participate in synchronization (whether synchronization between processes has been completed). Specifically, the control unit 350 compares the mask "0101" and the synchronization state "0100" in the mask information table 340 with each other. As a result of comparison, the mask "0101" and the synchronization state "0100" do not match each other, and therefore it is determined that a synchronization request has not been received from all processes that participate in synchronization (synchronization between processes has not been completed). The control unit 350 then waits for receiving the remaining synchronization request.

Upon receiving a synchronization request from the node (0) after receiving a synchronization request from the node (2), as with the case of receiving a synchronization request from the node (2), the control unit 350 updates the synchronization state in the mask information table 340. That is, based on "index00" corresponding to "communication ID=00" contained in the mask generation request received from the process in the node (0), the control unit 350 updates a corresponding portion (right end) of the synchronization state in the mask information table 340 from "0" to "1".

After updating the synchronization state, as with the case of receiving a synchronization request from the node (2), the control unit 350 determines whether a synchronization request has been received from all processes that participate in synchronization (whether synchronization between processes has been completed). Specifically, the control unit 350 compares the mask "0101" and the synchronization state "0101" in the mask information table 340 with each other. As a result of comparison, the mask "0101" and the synchronization state "0101" match each other, and therefore it is determined that a synchronization request has been received from all processes that participate in synchronization (synchronization between processes has been completed). Then, from the communication context table 330, the control unit 350 obtains information for communicating with the node (0) and the node (2), and transmits to the node (0) and the node (2) a synchronization response indicating that synchronization between processes has been completed.

After transmitting the synchronization response, the control unit 350 initializes the synchronization state (sets all values to "0") in the mask information table 340 to prepare for receiving the next synchronization request. Then, if the job has not yet ended, the control unit 350 continues the synchronization request process. On the other hand, if the job has ended, the process ends (at this moment, all pieces of information in the mask information table 340 are initialized).

Figure 6:
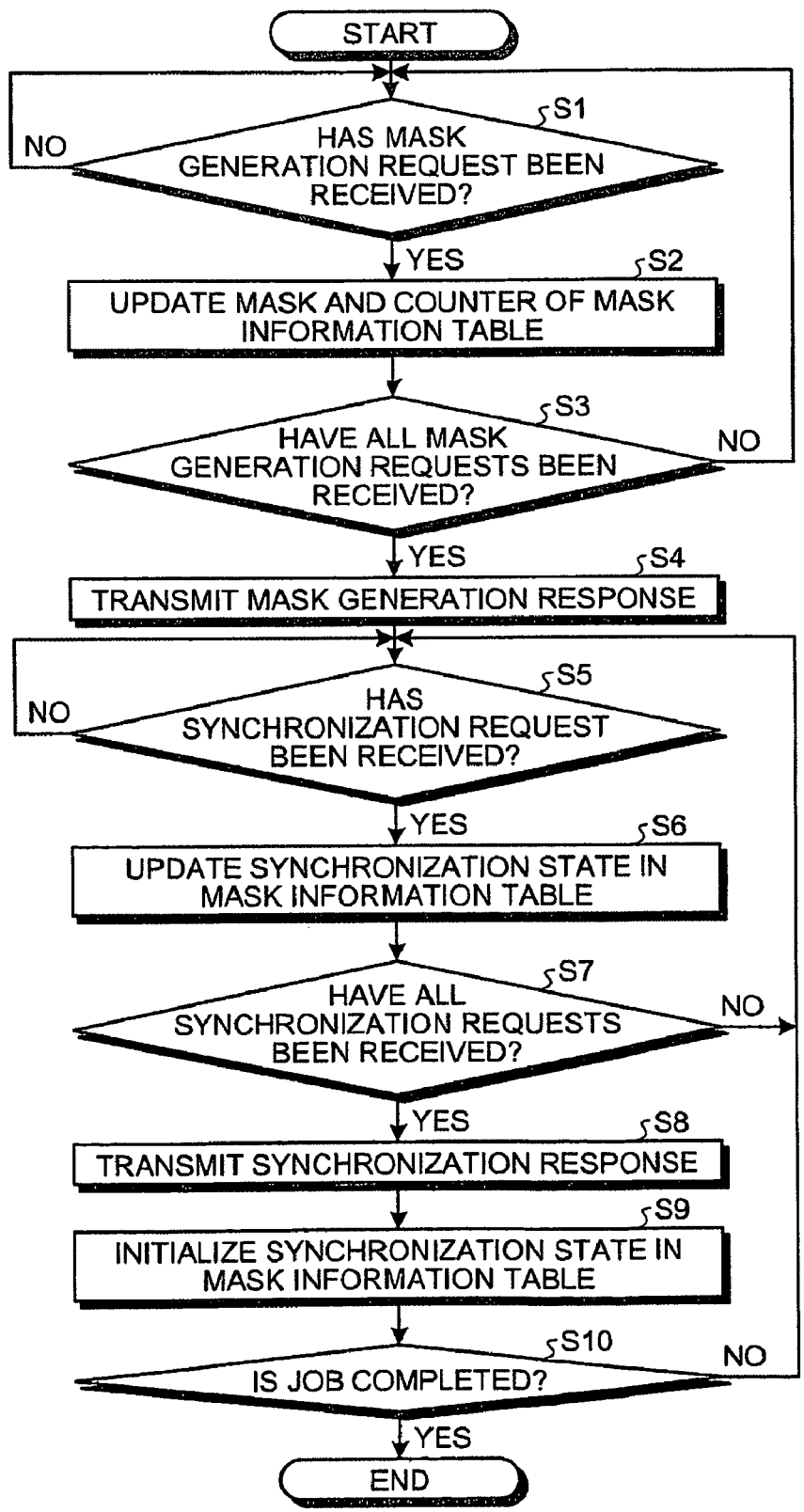
FIG. 6 is an example flowchart of the operation of the node-to-node synchronizing apparatus according to the first embodiment.

FIG. 6 is a flowchart of the operation of the node-to-node synchronizing apparatus according to the first embodiment. In the following, an example is explained in which, among the computing nodes 100, a process in the node (0) and a process in the node (2) participate in synchronization.

As depicted in FIG. 6, upon receiving a mask generation request from a process in the node (0) that participates in synchronization (Yes at Step S1), the control unit 350 of the node-to-node synchronizing apparatus 300 updates the mask and the counter in the mask information table 340 (Step S2).

That is, based on "index00" corresponding to "communication ID=00" contained in the mask generation request, the control unit 350 updates a corresponding portion (right end) of the mask in the mask information table 340 from "0" to "1", and increments the counter in the mask information table 340 by "1".

The control unit 350 then determines whether a mask generation request has been received from all processes that participate in synchronization (Step S3). Specifically, from the mask generation request received from the node (0), the control unit 350 obtains the number of processes "2" that participate in synchronization, and compares the obtained number with the counter value "1" in the mask information table 340. As a result of comparison, the number of processes "2" obtained from the mask generation request and the counter value "1" in the mask information table 340 do not match each other, and therefore it is determined that a mask generation request has not been received from all processes that participate in synchronization (No at Step S3). The control unit 350 then returns to Step S1 to wait for receiving the remaining mask generation request.

After receiving a mask generation request from the node (0), upon receiving a mask generation request from the node (2) (Yes at Step S1), as with the case of receiving a mask generation request from the node (0), the control unit 350 updates the mask and the counter in the mask information table 340 (Step S2). That is, based on "index02" corresponding to "communication ID=02" contained in the mask generation request received from a process in the node (2), the control unit 350 updates a corresponding portion (second from left) of the mask in the mask information table 340 from "0" to "1", and increments the counter in the mask information table 340 by "1".

Then, as with the case of receiving a mask generation request from the node (0), the control unit 350 determines whether a mask generation request has been received from all processes that participate in synchronization (Step S3). That is, from the mask generation request received from the node (2), the control unit 350 obtains the number of processes "2" that participate in synchronization, and then compares the obtained number with the counter value "2" in the mask information table 340. As a result of comparison, the number of processes "2" obtained from the mask generation request and the counter value "2" in the mask information table 340 match each other, and therefore it is determined that a mask generation request has been received from all processes that participate in synchronization (Yes at Step S3).

Then, from the communication context table 330, the control unit 350 obtains information for communicating with the node (0) and the node (2), and transmits to the node (0) and the node (2) a mask generation response indicating the completion of mask generation (Step S4). That is, based on the index corresponding to the communication ID contained in the mask generation request received from each of the processes in the node (0) and the node (2), from the communication context table 330, the control unit 350 obtains a node ID and an intra node communication ID for communicating with each of the processes in the node (0) and the node (2).

After transmitting the mask generation response, the control unit 350 waits for receiving a synchronization request from each of the node (0) and the node (2) (Step S5). Then, upon receiving a synchronization request from the process in the node (2) (Yes at Step S5), based on "index02" corresponding to "communication ID=02" contained in the synchronization request, the control unit 350 updates a corresponding portion (second from left) of the synchronization state in the mask information table 340 from "0" to "1" (Step S6).

After updating the synchronization state, the control unit 350 determines whether a synchronization request has been received from all processes that participate in synchronization (whether synchronization between processes has been completed) (Step S7). That is, the control unit 350 compares the mask "0101" and the synchronization state "0100" in the mask information table 340 with each other. As a result of comparison, the mask "0101" and the synchronization state "0100" do not match each other, and therefore it is determined that a synchronization request has not been received from all processes that participate in synchronization (synchronization between processes has not been completed) (No at Step S7). The control unit 350 then returns to Step S5, and waits for receiving the remaining synchronization request.

Upon receiving a synchronization request from the node (0) after receiving a synchronization request from the node (2), as with the case of receiving a synchronization request from the node (2), the control unit 350 updates the synchronization state in the mask information table 340 (Step S6). That is, based on "index00" corresponding to "communication ID=00" contained in the mask generation request received from the process in the node (0), the control unit 350 updates a corresponding portion (right end) of the synchronization state in the mask information table 340 from "0" to "1".

After updating the synchronization state, as with the case of receiving a synchronization request from the node (2), the control unit 350 determines whether a synchronization request has been received from all processes that participate in synchronization (whether synchronization between processes has been completed) (Step S7). That is, the control unit 350 compares the mask "0101" and the synchronization state "0101" in the mask information table 340 with each other. As a result of comparison, the mask "0101" and the synchronization state "0101" match each other, and therefore it is determined that a synchronization request has been received from all processes that participate in synchronization (synchronization between processes has been completed) (Yes at Step S7). Then, from the communication context table 330, the control unit 350 obtains information for communicating with the node (0) and the node (2), and transmits to the node (0) and the node (2) a synchronization response indicating that synchronization between processes has been completed (Step S8).

After transmitting the synchronization response, the control unit 350 initializes the synchronization state (sets all values to "0") in the mask information table 340 (Step S9) to prepare for receiving the next synchronization request (Step S10). Then, if the job is not yet completed (No at Step S10), the control unit 350 continues the synchronization request process (Steps S5 to S9). On the other hand, if the job is completed (Yes at Step S10), the process ends (at this moment, all pieces of information in the mask information table 340 are initialized).

As described above, according to the first embodiment, upon receipt of a mask generation request for generation of a mask indicating the location of processes is received from each of the processes that participates in synchronization, the mask is automatically generated. With this, a mask can be automatically generated while cost burden is reduced in exchanging information among nodes. Moreover, since a mask is generated in response to a request from each of processes that participates in synchronization, a mask indicating the location of the processes for synchronization can be dynamically changed in a job.

Besides, the node-to-node synchronizing apparatus of the first embodiment described above may be applied to a computing apparatus that performs a global computation, such as those to find a minimum value, maximum value, or total of samples, in a synchronized manner.

[b] Second Embodiment

Figure 7:
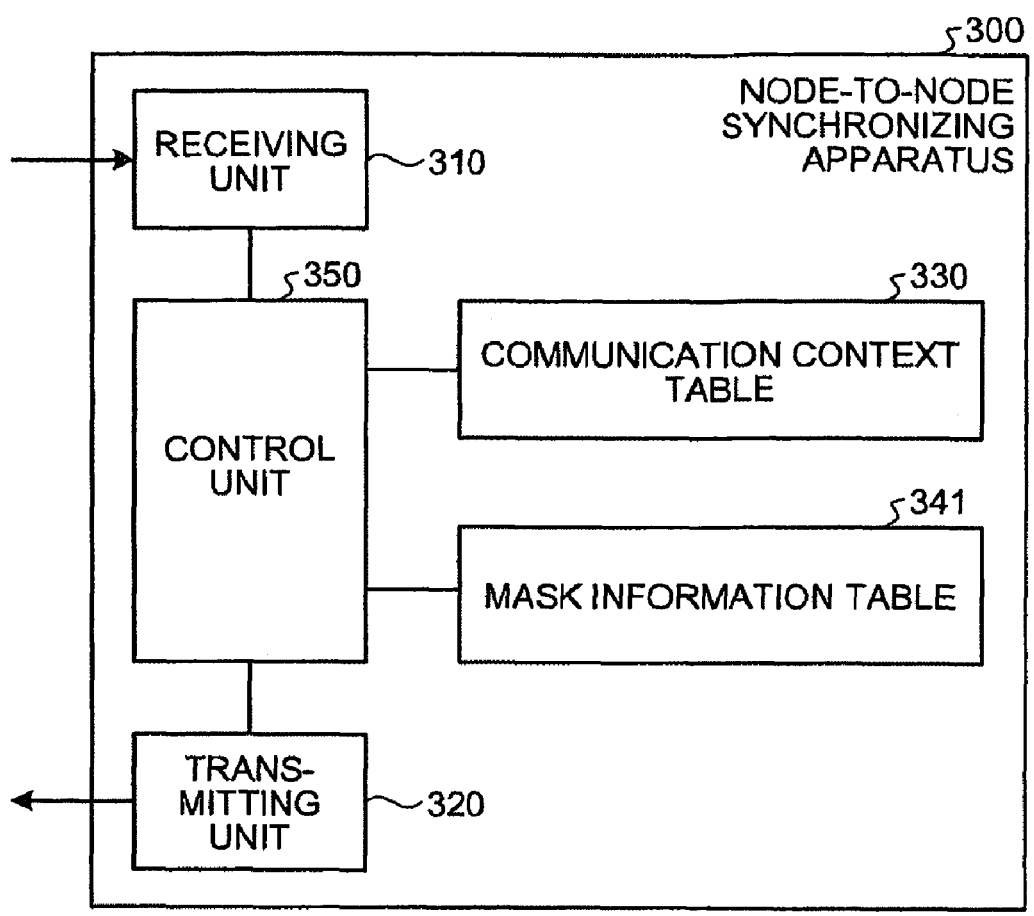
FIG. 7 is an example block diagram of a node-to-node synchronizing apparatus according to a second embodiment.

FIG. 7 is a block diagram of a node-to-node synchronizing apparatus according to a second embodiment. As depicted in FIG. 7, the node-to-node synchronizing apparatus 300 according to the second embodiment is different from that of the first embodiment in that a mask information table 341 is provided in place of the mask information table 340.

FIG. 8 illustrates an example of the structure of the mask information table 341 according to the second embodiment. As depicted in FIG. 8, a mask information table 341 has a process set identifier (set ID) that uniquely specifies a set of processes that execute parallel jobs and index in the mask information table 341 in correspondence to each other, and stores mask, synchronization state, and counter for each set ID.

Thus, according to the second embodiment, process-to-process synchronization due to a plurality of parallel jobs can be processed concurrently.

[c] Third Embodiment

Figure 9:
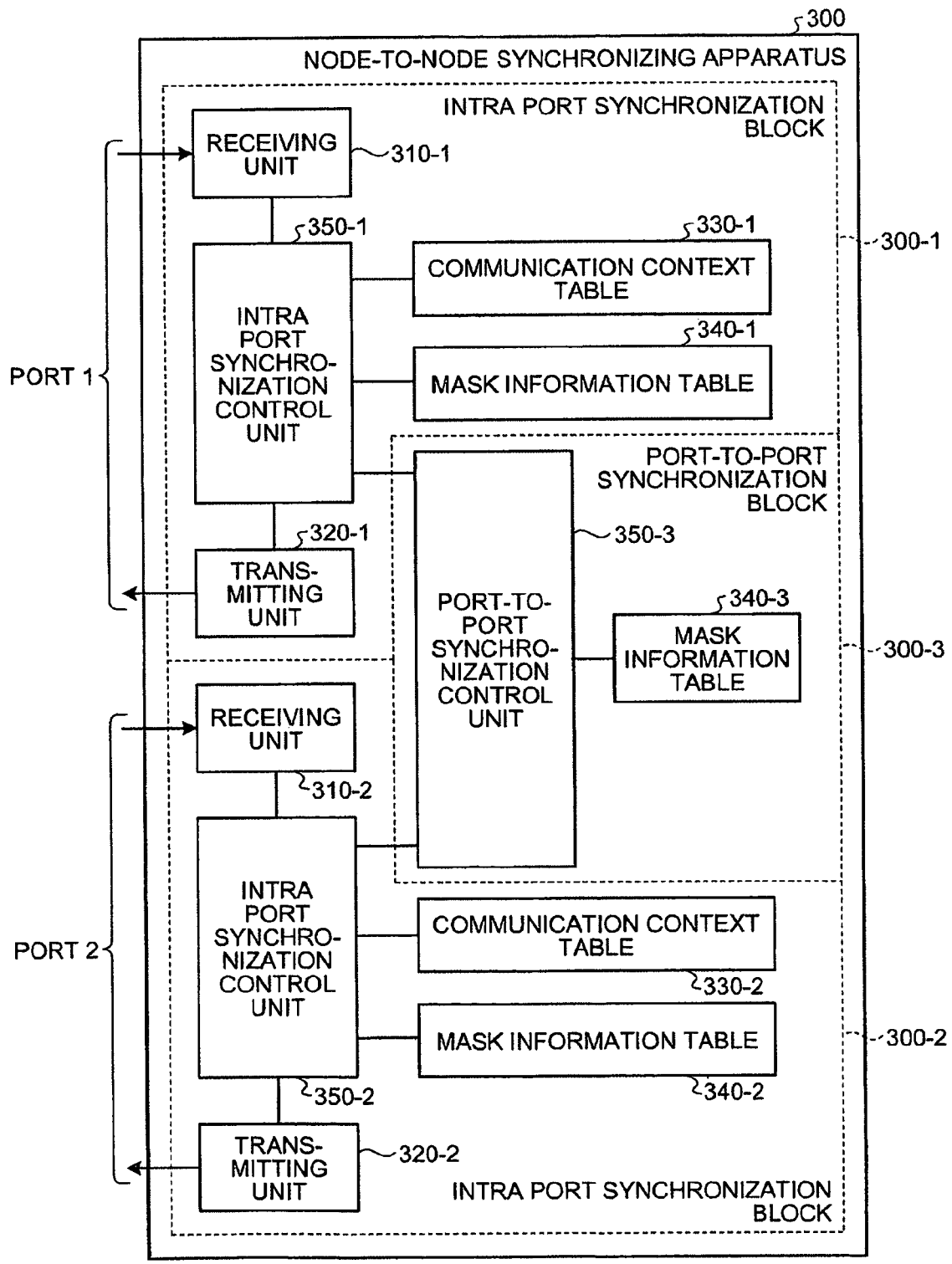
FIG. 9 is an example block diagram of a node-to-node synchronizing apparatus according to a third embodiment.

FIG. 9 is a block diagram of a node-to-node synchronizing apparatus according to a third embodiment. The node-to-node synchronizing apparatus 300 according to the third embodiment is different from those of the embodiments described above in the following points.

That is, the node-to-node synchronizing apparatus 300 includes an intra port synchronization block 300-1 corresponding to a port 1, an intra port synchronization block 300-2 corresponding to a port 2, and a port-to-port synchronization block 300-3, and achieves synchronization between the port 1 and the port 2.

The intra port synchronization block 300-1 includes a receiving unit 310-1, a transmitting unit 320-1, a communication context table 330-1, a mask information table 340-1, and an intra port synchronization control unit 350-1, and has functions similar to those of the node-to-node synchronizing apparatus 300 explained in the first embodiment. Here, for the purpose of port-to-port synchronization, the number of mask generation requests is counted in a port-to-port synchronization block, which will be explained later. Therefore, the mask information table 340-1 is not provided with a counter.

The intra port synchronization block 300-2 includes a receiving unit 310-2, a transmitting unit 320-2, a communication context table 330-2, a mask information table 340-2, and an intra port synchronization control unit 350-2, and has functions similar to those of the node-to-node synchronizing apparatus 300 explained in the first embodiment. Here, due to the reason explained as to the intra port synchronization block 300-1 above, the mask information table 340-2 is not provided with a counter.

The port-to-port synchronization block 300-3 includes a mask information table 340-3 and a port-to-port synchronization control unit 350-3. The mask information table 340-3 contains a mask, synchronization state, and counter corresponding to each of the ports (the port 1 and the port 2). By using the mask information table 340-3, the port-to-port synchronization control unit 350-3 participates in synchronization between the ports.

In the following, with reference to FIGS. 10 and 11, an example is explained in which two processes in the computing node 100 connected to the port 1 and one process in the computing node 100 connected to the port 2 participate in synchronization. FIGS. 10 and 11 are diagrams for explaining information transition in the mask information table according to the third embodiment.

Values depicted in FIG. 10 are as follows: from left, values in the mask information table 340-1 of the intra port synchronization block 300-1 corresponding to the port 1, values in the mask information table 340-2 of the intra port synchronization block 300-2, and values in the mask information table 340-3 of the port-to-port synchronization block 300-3.

In an initial state, the values of the mask, the synchronization state, and counter of the port 1, port 2, and port-to-port are 0 (see (1) in FIG. 10).

Upon receiving a mask generation request containing, for example, "communication ID=0" and "the number of processes=3", via the port 1 from any of the processes in the computing node 100 that participate in synchronization, the intra port synchronization control unit 350-1 of the intra port synchronization block 300-1 updates the mask in the mask information table 340-1 in a procedure similar to that in the first embodiment (see (2) in FIG. 10), and then transfers the mask generation request to the port-to-port synchronization block 300-3.

After transferring the mask generation request, the intra port synchronization control unit 350-1 waits for receiving a mask generation response indicate that a mask generation request has been received from all processes that participate in synchronization. Also, upon receiving a mask generation request before receiving a mask generation response, the intra port synchronization control unit 350-1 updates the mask and transfers the mask generation request in a manner similar to that described above.

Upon receiving a mask generation response from the port-to-port synchronization block 300-3, the intra port synchronization control unit 350-1 waits for receiving a synchronization response.

Upon receiving the mask generation request from the intra port synchronization block 300-1, the port-to-port synchronization control unit 350-3 of the port-to-port synchronization block 300-3 updates the mask and the counter in the mask information table 340-3. Specifically, when receiving a mask generation request from the intra port synchronization block 300-1, the port-to-port synchronization control unit 350-3 updates a portion (right) of the mask corresponding to the port 1 in the mask information table 340-3 from "0" to "1" (see (2) in FIG. 10). Furthermore, the port-to-port synchronization control unit 350-3 increments the counter in the mask information table 340-3 by "1". At this moment, the counter value becomes "1" (see (2) in FIG. 10).

Then, the port-to-port synchronization control unit 350-3 determines whether a mask generation request has been received from all processes that participate in synchronization. Specifically, the port-to-port synchronization control unit 350-3 obtains the number of processes "3" that participate in synchronization from the mask generation request received from the intra port synchronization block 300-1, and compares the obtained number with the counter value "1" in the mask information table 340-3 with each other. As a result of comparison, the number of processes "3" obtained from the mask generation request and the counter value "1" in the mask information table 340-3 do not match each other, and therefore it is determined that a mask generation request has not been received from all processes that participate in synchronization. The port-to-port synchronization control unit 350-3 then waits for receiving the remaining mask generation requests.

Upon receiving a mask generation request containing, for example, "communication ID=2" and "the number of processes=3", via the port 2 from any of the processes in the computing node 100 that participate in synchronization, the intra port synchronization control unit 350-2 of the intra port synchronization block 300-2 updates the mask in the mask information table 340-2 in a procedure similar to that of the first embodiment (see (3) in FIG. 10), and then transfers the mask generation request to the port-to-port synchronization block 300-3.

Upon receiving the mask generation request from the intra port synchronization block 300-2, the port-to-port synchronization control unit 350-3 of the port-to-port synchronization block 300-3 updates the mask and the counter in the mask information table 340-3. Specifically, upon receiving the mask generation request from the intra port synchronization block 300-2, the port-to-port synchronization control unit 350-3 updates a portion (left) of the mask in the mask information table 340-3 corresponding to the port 2 from "0" to "1" (see (3) in FIG. 10). Furthermore, the port-to-port synchronization control unit 350-3 increments the counter in the mask information table 340-3 by "1". At this moment, the counter value becomes "2" (see (3) in FIG. 10).

The port-to-port synchronization control unit 350-3 then determines whether a mask generation request has been received from all processes that participate in synchronization. Specifically, the port-to-port synchronization control unit 350-3 obtains the number of processes "3" that participate in synchronization from the mask generation request received from the intra port synchronization block 300-2, and compares the obtained number with the counter value "2" in the mask information table 340-3 with each other. As a result of comparison, the number of processes "3" obtained from the mask generation request and the counter value "2" in the mask information table 340 do not match each other, and therefore it is determined that a mask generation request has not been received from all processes that participate in synchronization. The port-to-port synchronization control unit 350-3 then waits for receiving the remaining mask generation request.

Upon receiving a mask generation request containing, for example, "communication ID=3" and "the number of processes=3", via the port 1 from any of the processes in the computing node 100 that participate in synchronization, the intra port synchronization control unit 350-1 of the intra port synchronization block 300-1 updates the mask in the mask information table 340-1 in a procedure similar to that described above (see (4) in FIG. 10), and then transfers the mask generation request to the port-to-port synchronization block 300-3.

Upon receiving the mask generation request from the intra port synchronization block 300-1, the port-to-port synchronization control unit 350-3 of the port-to-port synchronization block 300-3 updates the mask and the counter in the mask information table 340-3. Specifically, upon receiving the mask generation request from the intra port synchronization block 300-1, the port-to-port synchronization control unit 350-3 updates a portion (right) of the mask in the mask information table 340-3 corresponding to the port 1 from "0" to "1". However, since the value of the mask has already been updated to "1", the value is left as it is (see (4) in FIG. 10). Furthermore, the port-to-port synchronization control unit 350-3 increments the counter in the mask information table 340-3 by "1". At this moment, the counter value becomes "3" (see (4) in FIG. 10).

The port-to-port synchronization control unit 350-3 then determines whether a mask generation request has been received from all processes that participate in synchronization. Specifically, the port-to-port synchronization control unit 350-3 obtains the number of processes "3" that participate in synchronization from the mask generation request received from the intra port synchronization block 300-1, and compares the obtained number with the counter value "3" in the mask information table 340-3 with each other. As a result of comparison, the number of processes "3" obtained from the mask generation request and the counter value "3" in the mask information table 340-3 match each other, and therefore it is determined that a mask generation request has been received from all processes that participate in synchronization. Then, by referring to the mask in the mask information table 340-3, the port-to-port synchronization control unit 350-3 transmits a mask generation response indicating that mask generation has been completed to the intra port synchronization block 300-1 and the intra port synchronization block 300-2.

Upon receiving the mask generation response from the port-to-port synchronization block 300-3, the intra port synchronization block 300-1 obtains information for communicating with the computing node(s) 100 transmitting the mask generation request (for example, the node (0) and the node (3)) from the communication context table 330 in a procedure similar to that in the first embodiment, and transfers a mask generation response indicating that mask generation has been completed. Similarly, upon receiving the mask generation response from the port-to-port synchronization block 300-3, the intra port synchronization block 300-2 obtains information for communicating with the computing node(s) 100 transmitting the mask generation request (for example, the node (2)) from the communication context table 330 in a procedure similar to that in the first embodiment, and transfers a mask generation response indicating that mask generation has been completed.

Upon receiving a synchronization request containing, for example, "communication ID=2", via the port 2 from any of the processes in the computing node 100 that request for synchronization, the intra port synchronization control unit 350-2 of the intra port synchronization block 300-2 updates the synchronization state in the mask information table 340-2 in a procedure similar to the first embodiment (see (5) in FIG. 11).

The intra port synchronization control unit 350-2 determines, within the range of the port 2, whether a synchronization request has been received from all processes that participate in synchronization (whether synchronization between processes has been completed). Specifically, the intra port synchronization control unit 350-2 compares the mask "0100" and the synchronization state "0100" in the mask information table 340-2 with each other in a procedure similar to that described above (see (5) in FIG. 11). As a result of comparison, the mask "0100" and the synchronization state "0100" match each other, and therefore it is determined that a synchronization request has been received from all processes that participate in synchronization within the range of the port 2 (synchronization between process has been completed). The intra port synchronization control unit 350-2 then transfers the synchronization request to the port-to-port synchronization block 300-3.

Upon receiving the synchronization request from the intra port synchronization block 300-2, the port-to-port synchronization control unit 350-3 of the port-to-port synchronization block 300-3 updates the synchronization state in the mask information table 340-3. Specifically, when receiving the synchronization request from the intra port synchronization block 300-2, the port-to-port synchronization control unit 350-3 updates a portion (left) of the synchronization state in the mask information table 340-3 corresponding to the port 2 from "0" to "1" (see (5) in FIG. 11).

After updating the synchronization state, the port-to-port synchronization control unit 350-3 determines whether port-to-port synchronization has been completed. Specifically, the port-to-port synchronization control unit 350-3 compares the mask "11" and the synchronization state "10" in the mask information table 340-3 with each other (see (5) in FIG. 11). As a result of comparison, the mask "11" and the synchronization state "10" do not match each other, and therefore it is determined that port-to-port synchronization has not been completed. The port-to-port synchronization control unit 350-3 then waits for receiving the remaining synchronization request from the intra port synchronization block 300-1 (port 1 side).

Upon receiving the synchronization request containing, for example, "communication ID=3", via the port 1 from any of the processes in the computing node 100 that request for synchronization, the intra port synchronization control unit 350-1 of the intra port synchronization block 300-1 updates the synchronization state in the mask information table 340-1 in a procedure similar to that of the first embodiment (see (6) in FIG. 11).

After updating the synchronization state, the intra port synchronization control unit 350-1 determines, within the range of the port 1, whether a synchronization request has been received from all processes that participate in synchronization (whether synchronization between processes has been completed). Specifically, the intra port synchronization control unit 350-1 compares the mask "1001" and the synchronization state "1000" in the mask information table 340-1 with each other in a procedure similar to that of the first embodiment (see (6) in FIG. 11). As a result of comparison, the mask "1001" and the synchronization state "1000" do not match each other, and therefore it is determined that a synchronization request has not been received from all processes that participate in synchronization within the range of the port 1 (synchronization between processes has not been completed). The intra port synchronization control unit 350-1 then waits for receiving the remaining synchronization request without transferring the synchronization request to the port-to-port synchronization block 300-3.

Then, upon receiving a synchronization request containing, for example, "communication ID=0", via the port 1 from any of the processes in the computing node 100 that request for synchronization, the intra port synchronization control unit 350-1 updates the synchronization state in the mask information table 340-1 in a procedure similar to that described above (see (7) in FIG. 11).

After updating the synchronization state, the intra port synchronization control unit 350-1 determines, within the range of the port 1, whether a synchronization request has been received from all processes that participate in synchronization (whether synchronization between processes has been completed). Specifically, the intra port synchronization control unit 350-1 compares the mask "1001" and the synchronization state "1001" in the mask information table 340-1 with each other in a procedure similar to that described above (see (7) in FIG. 11). As a result of comparison, the mask "1001" and the synchronization state "1001" match each other, and therefore it is determined that a synchronization request has been received from all processes that participate in synchronization within the range of the port 1 (synchronization between processes has been completed). The intra port synchronization control unit 350-1 then transfers the synchronization request to the port-to-port synchronization block 300-3.

Upon receiving the synchronization request from the intra port synchronization block 300-1, the port-to-port synchronization control unit 350-3 of the port-to-port synchronization block 300-3 updates the synchronization state in the mask information table 340-3. Specifically, when receiving the synchronization request from the intra port synchronization block 300-1, the port-to-port synchronization control unit 350-3 updates a portion (right) of the synchronization state in the mask information table 340-3 corresponding to the port 1 from "0" to "1" (see (7) in FIG. 11).

After updating the synchronization state, the port-to-port synchronization control unit 350-3 determines whether port-to-port synchronization has been completed. Specifically, the port-to-port synchronization control unit 350-3 compares the mask "11" and the synchronization state "11" in the mask information table 340-3 (see (7) in FIG. 11). As a result of comparison, the mask "11" and the synchronization state "11" match each other, and therefore it is determined that port-to-port synchronization has been completed. Then, by referring to the mask in the mask information table 340-3, the port-to-port synchronization control unit 350-3 transmits a synchronization response indicating that port-to-port synchronization has been completed to the intra port synchronization block 300-1 and the intra port synchronization block 300-2.

After transmitting the synchronization response, the port-to-port synchronization control unit 350-3 initializes the synchronization state (sets all values to "0") in the mask information table 340-3 (see (8) in FIG. 11), and waits for a job completion notification from the intra port synchronization block 300-1 and the intra port synchronization block 300-2. Then, if a job completion notification has not been received from the intra port synchronization block 300-1 and the intra port synchronization block 300-2, the port-to-port synchronization control unit 350-3 continues the process of synchronization-request port-to-port synchronization. Upon receiving a job completion notification from the intra port synchronization block 300-1 and the intra port synchronization block 300-2, the port-to-port synchronization control unit 350-3 ends the process, and initializes the mask in the mask information table 340-3.

Upon receiving the synchronization response from the port-to-port synchronization block 300-3, the intra port synchronization block 300-1 obtains information for communicating with the computing node(s) 100 transmitting the mask generation request (for example, the node (0) and the node (3)) from the communication context table 330 in a procedure similar to that in the first embodiment, and transfers a synchronization response indicating that synchronization between processes has been completed.

The intra port synchronization block 300-1 then initializes the synchronization state (sets all values to "0") in the mask information table 340-1 (see (8) in FIG. 11), and prepares for receiving the next synchronization request. Then, if the job has not yet ended, the intra port synchronization block 300-1 continues the synchronization request process. On the other hand, if the job has ended, the intra port synchronization block 300-1 ends the process (at this moment, initializes all pieces of information in the mask information table 340-1), and transmits the end of the job to the port-to-port synchronization block 300-3.

As with the intra port synchronization block 300-1, upon receiving the synchronization response from the port-to-port synchronization block 300-3, the intra port synchronization block 300-2 obtains information for communicating with the computing node(s) 100 transmitting the mask generation request (for example, the node (2)) from the communication context table 330 in a procedure similar to that in the first embodiment, and transfers a synchronization response indicating that synchronization between processes has been completed.

The intra port synchronization block 300-2 then initializes the synchronization state (sets all values to "0") in the mask information table 340-2 (see (8) in FIG. 11), and prepares for receiving the next synchronization request. Then, if the job has not yet ended, the intra port synchronization block 300-2 continues the synchronization request process. On the other hand, if the job has ended, the intra port synchronization block 300-2 ends the process (at this moment, initializes all pieces of information in the mask information table 340-2), and transmits the end of the job to the port-to-port synchronization block 300-3.

Figure 12:
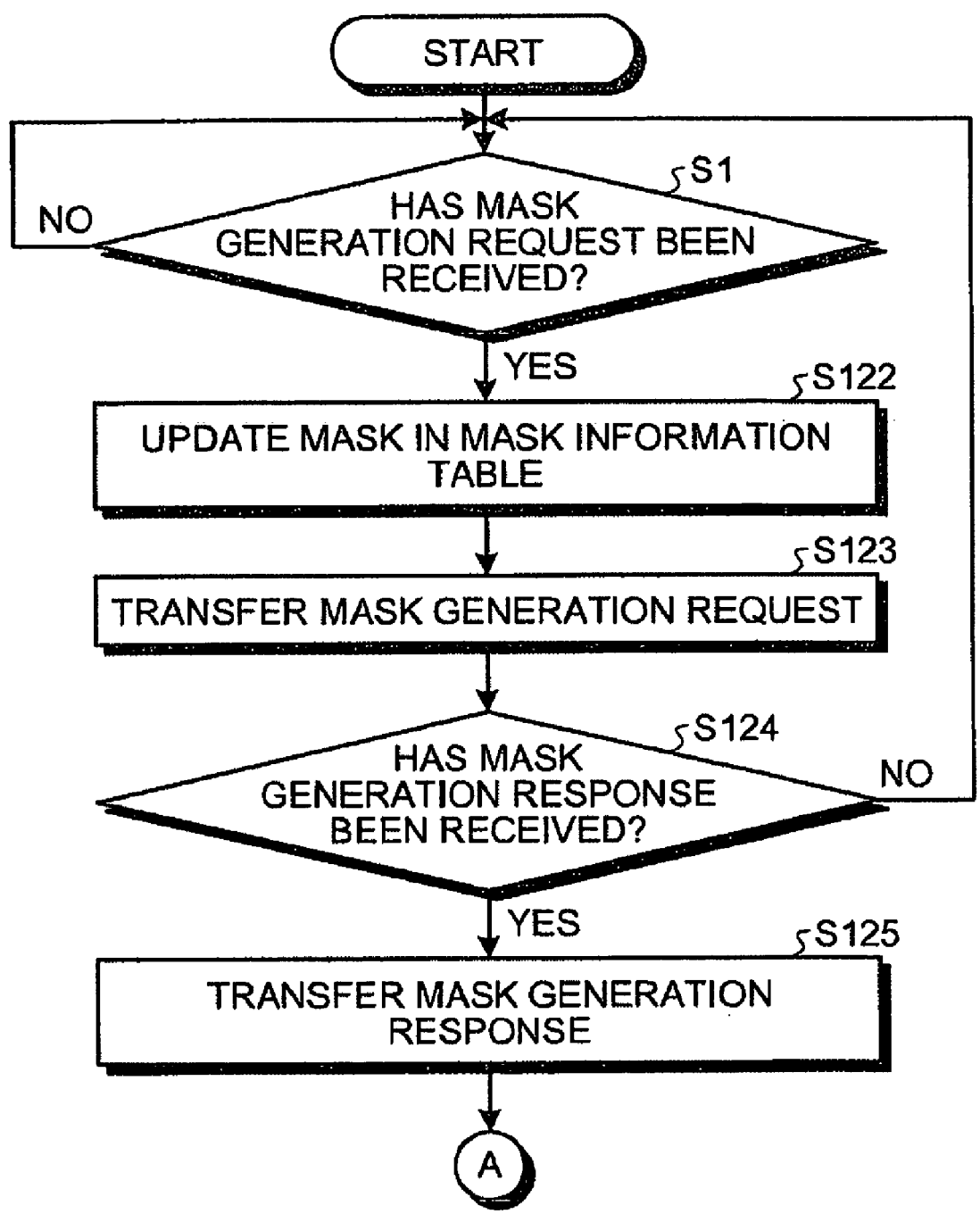
FIGS. 12 and 13 are example flowcharts of the operation of an intra port synchronization control unit according to the third embodiment.
Figure 13:
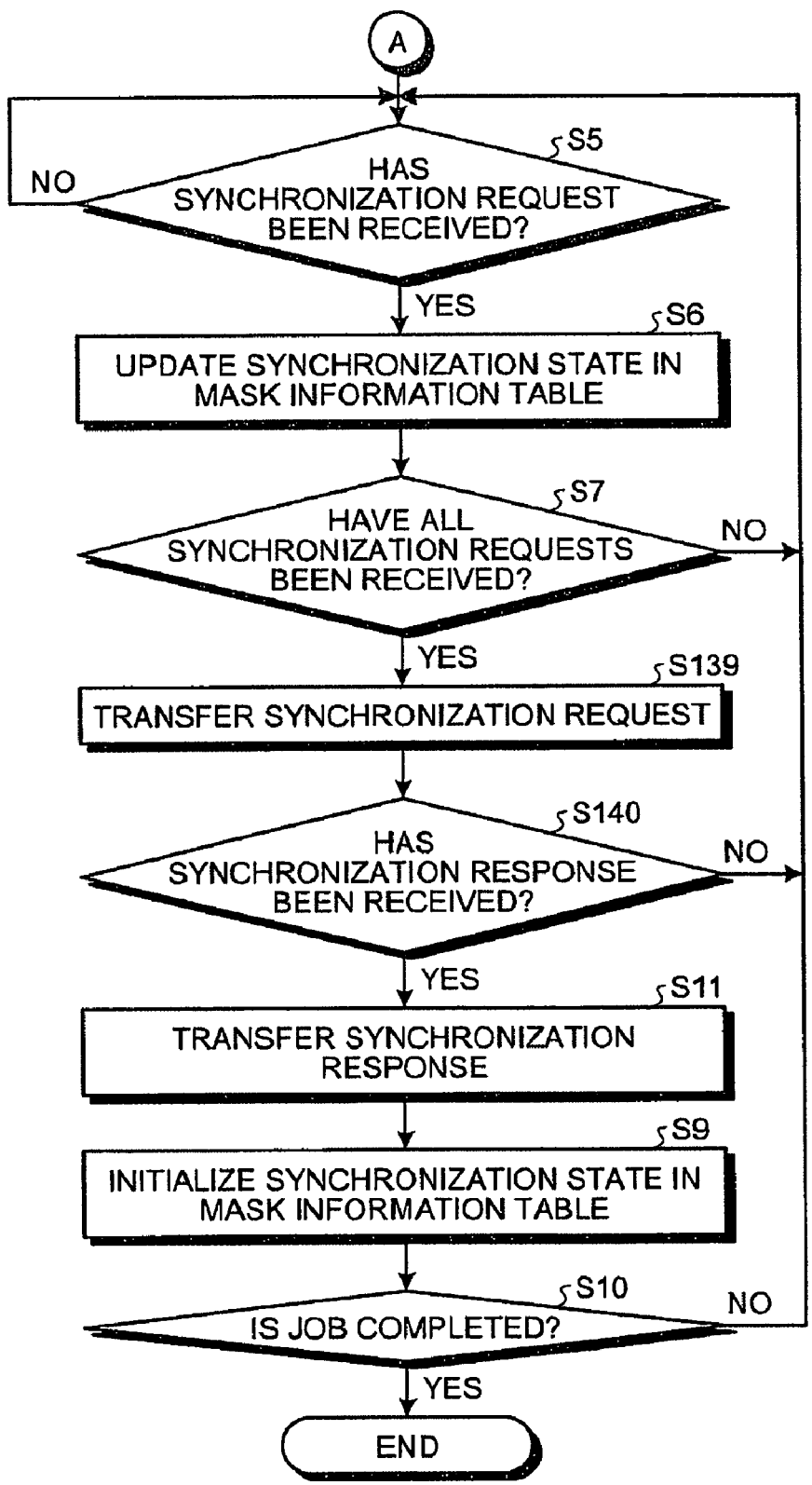
Figure 14:
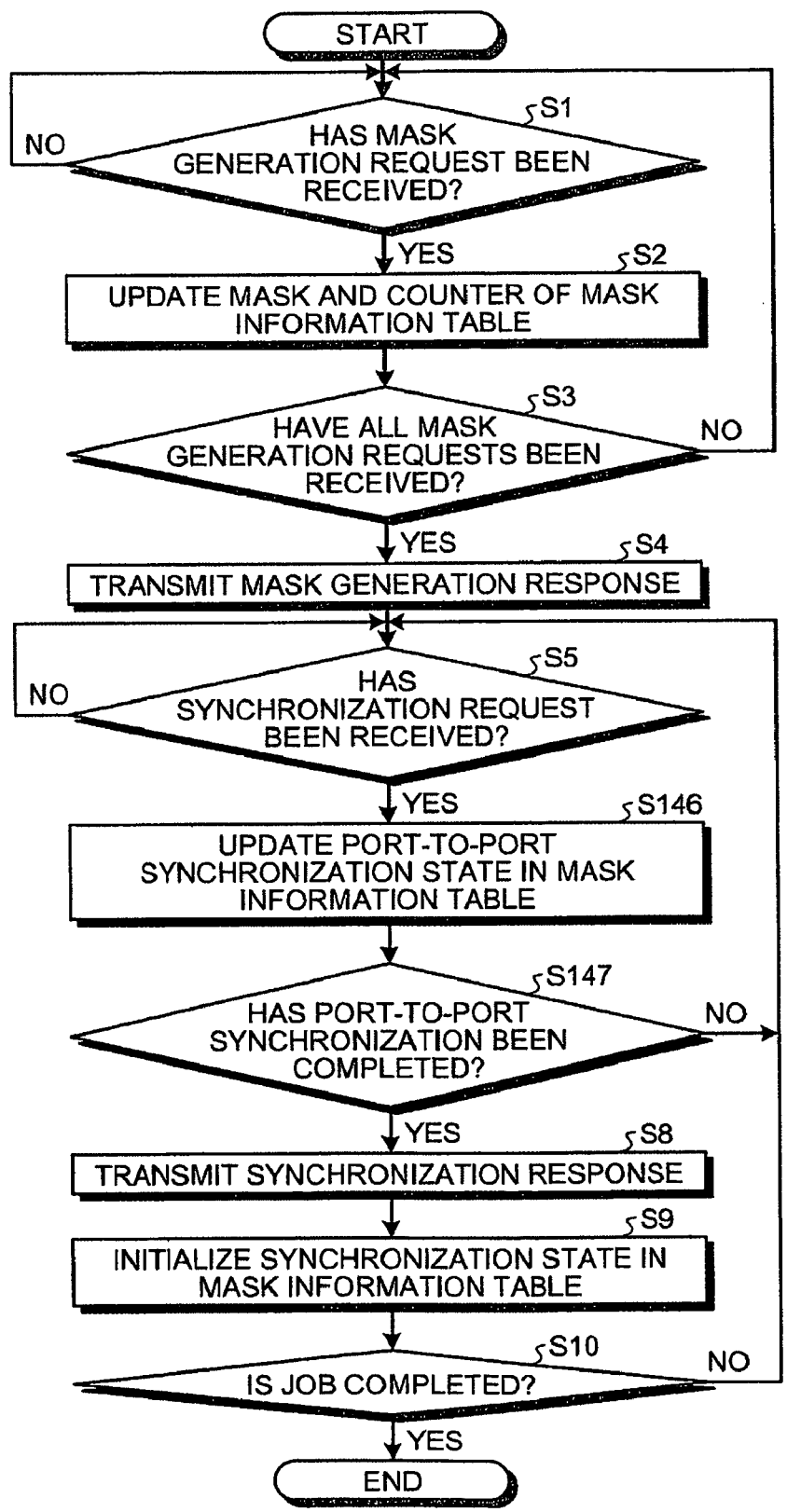
FIG. 14 is an example flowchart of the operation of a port-to-port synchronization control unit according to the third embodiment.

FIGS. 12 and 13 are flowcharts of the operation of the intra port synchronization control unit according to the third embodiment. FIG. 14 is a flowchart of the operation of the port-to-port synchronization control unit according to the third embodiment. In the following, an example is explained in which the port 1 and the port 2 participate in two-port synchronization.

As depicted in FIG. 12, for example, upon receiving a mask generation request containing, for example, "communication ID=0" and "the number of processes=3", via the port 1 from any of the processes in the computing node 100 that participate in synchronization (Yes at Step S1), the intra port synchronization control unit 350-1 updates the mask in the mask information table 340-1 (Step S122). Then, the intra port synchronization control unit 350-1 transfers the mask generation request to the port-to-port synchronization block 300-3 (Step S123).

After transferring the mask generation request, the intra port synchronization control unit 350-1 waits for receiving a mask generation response indicating that a mask generation request has been received from all processes that participate in synchronization (Step S124). In the state of not yet receiving a mask generation response (No at Step S124), upon receiving a mask generation request, the intra port synchronization control unit 350-1 updates the mask and transfers the mask generation request in a similar manner as described above (Steps S1 to S123).

Upon receiving a mask generation response from the port-to-port synchronization block 300-3 (Yes at Step S124), the intra port synchronization block 300-1 obtains information for communicating with the computing node(s) 100 transmitting the mask generation request (for example, the node (0) and the node (3)) from the communication context table 330, and transfers a mask generation response indicating that mask generation has been completed (Step S125).

Then, as depicted in FIG. 13, after transferring the mask generation response, the intra port synchronization control unit 350-1 waits for receiving a synchronization request (Step S5). Upon receiving a synchronization request containing, for example "communication ID=3", via the port 1 from any of the processes in the computing node 100 that request for synchronization (Yes at Step S5), the intra port synchronization control unit 350-1 updates the synchronization state in the mask information table 340-1 (Step S6).

After updating the synchronization state, the intra port synchronization control unit 350-1 determines, within the range of the port 1, whether a synchronization request has been received from all processes that participate in synchronization (whether synchronization between processes has been completed) (Step S7). For example, the intra port synchronization control unit 350-1 compares the mask "1001" and the synchronization state "1000" in the mask information table 340-1 with each other. As a result of comparison, the mask "1001" and the synchronization state "1000" do not match each other, and therefore it is determined that a synchronization request has not been received from all processes that participate in synchronization within the range of the port 1 (synchronization between processes has not been completed) (No at Step S7). The intra port synchronization control unit 350-1 then returns to Step S6 described above without transferring the synchronization request to the port-to-port synchronization block 300-3, and waits for receiving the remaining synchronization request.

Then, upon receiving a synchronization request containing, for example, "communication ID=0", via the port 1 from any of the processes in the computing node 100 that request for synchronization (Yes at Step S5), the intra port synchronization control unit 350-1 updates the synchronization state in the mask information table 340-1 in a similar manner as described above (Step S6).

After updating the synchronization state, the intra port synchronization control unit 350-1 determines, within the range of the port 1, whether a synchronization request has been received from all processes that participate in synchronization (whether synchronization between processes has been completed) in a similar manner as described above (Step S7). For example, the intra port synchronization control unit 350-1 compares the mask "1001" and the synchronization state "1001" in the mask information table 340-1 with each other. As a result of comparison, the mask "1001" and the synchronization state "1001" match each other, and therefore it is determined that a synchronization request has been received from all processes that participate in synchronization within the range of the port 1 (synchronization between processes has been completed) (Yes at Step S7). The intra port synchronization control unit 350-1 then transfers the synchronization request to the port-to-port synchronization block 300-3 (Step S139).

After transferring the synchronizing request, the intra port synchronization block 300-1 waits for receiving a synchronization response (Step S140). Upon receiving a synchronization response from the port-to-port synchronization block 300-3 (Yes at Step S140), the intra port synchronization block 300-1 obtains information for communicating with the computing node(s) 100 transmitting the mask generation request (for example, the node (0) and the node (3)) from the communication context table 330, and transfers a synchronization response indicating that synchronization between processes has been completed (Step S11).

The intra port synchronization block 300-1 then initializes the synchronization state in the mask information table 340-1 (sets all values to "0") (Step S9), and prepares for receiving the next synchronization request (Step S10). If the job is not yet completed (No at Step S10), the intra port synchronization block 300-1 returns to Step S5 described above to continue the synchronization request process (Steps S5 to S9). On the other hand, if the job is completed (Yes at Step S13), the intra port synchronization block 300-1 ends the process (at this moment, initializes all pieces of information in the mask information table 340-1), and transmits the end of the job to the port-to-port synchronization block 300-3.

As with the intra port synchronization control unit 350-1, as depicted in FIG. 12, upon receiving a mask generation request containing, for example, "communication ID=2" and "the number of processes=3", via the port 2 from any of the processes in the computing node 100 that participate in synchronization (Yes at Step S1), the intra port synchronization control unit 350-2 updates the mask in the mask information table 340-2 (Step S122). Then, the intra port synchronization control unit 350-2 transfers the mask generation request to the port-to-port synchronization block 300-3 (Step S123).

After transferring the mask generation request, the intra port synchronization control unit 350-2 waits for receiving a mask generation response indicating that a mask generation request has been received from all processes that participate in synchronization (Step S124). In the state of not yet receiving a mask generation response (No at Step S124), upon receiving a mask generation request, the intra port synchronization control unit 350-2 updates the mask and transfers the mask generation request in a similar manner as described above (Steps S1 to S123).

Upon receiving a mask generation response from the port-to-port synchronization block 300-3 (Yes at Step S124), the intra port synchronization block 300-2 obtains information for communicating with the computing node(s) 100 transmitting the mask generation request (for example, the node (2)) from the communication context table 330, and transfers a mask generation response indicating that mask generation has been completed (Step S125).

Then, as depicted in FIG. 13, after transferring the mask generation response, the intra port synchronization control unit 350-2 waits for receiving a synchronization request (Step S5). Upon receiving a synchronization request containing, for example "communication ID=2", via the port 2 from any of the processes in the computing node 100 that request for synchronization (Yes at Step S5), the intra port synchronization control unit 350-2 updates the synchronization state in the mask information table 340-2 (Step S6).

After updating the synchronization state, the intra port synchronization control unit 350-2 determines, within the range of the port 2, whether a synchronization request has been received from all processes that participate in synchronization (whether synchronization between processes has been completed) (Step S7). For example, the intra port synchronization control unit 350-2 compares the mask "0100" and the synchronization state "0100" in the mask information table 340-2 with each other. As a result of comparison, the mask "0100" and the synchronization state "0100" match each other, and therefore it is determined that a synchronization request has been received from all processes that participate in synchronization within the range of the port 2 (synchronization between processes has been completed) (Yes at Step S7). The intra port synchronization control unit 350-2 then transfers a synchronization request to the port-to-port synchronization block 300-3 (Step S9).

On the other hand, when the mask and the synchronization state do not match each other, the intra port synchronization control unit 350-2 determines that a synchronization request has not been received from all processes that participate in synchronization within the range of the port 2 (synchronization between processes has not been completed) (No at Step S7). The intra port synchronization control unit 350-2 then returns to Step S5 described above without transferring the synchronization request to the port-to-port synchronization block 300-3, and waits for receiving the remaining synchronization request.

After transferring the synchronizing request, the intra port synchronization block 300-2 waits for receiving a synchronization response (Step S10). Upon receiving a synchronization response from the port-to-port synchronization block 300-3 (Yes at Step S10), the intra port synchronization block 300-2 obtains information for communicating with the computing node(s) 100 transmitting the mask generation request (for example, the node (2)) from the communication context table 330, and transfers a synchronization response indicating that synchronization between processes has been completed (Step S11).

The intra port synchronization block 300-2 then initializes the synchronization state in the mask information table 340-2 (sets all values to "0") (Step S9), and prepares for receiving the next synchronization request (Step S10). If the job is not yet completed (No at Step S10), the intra port synchronization block 300-2 returns to Step S5 described above to continue the synchronization request process (Steps S5 to S9). On the other hand, if the job is completed (Yes at Step S13), the intra port synchronization block 300-2 ends the process (at this moment, initializes all pieces of information in the mask information table 340-2), and transmits the end of the job to the port-to-port synchronization block 300-3.

As depicted in FIG. 14, upon receiving the mask generation request from the intra port synchronization block 300-1 (Step S1), the port-to-port synchronization control unit 350-3 of the port-to-port synchronization block 300-3 updates the mask and the counter in the mask information table 340-3 (Step S2). For example, when receiving a mask generation request from the intra port synchronization block 300-1, the port-to-port synchronization control unit 350-3 updates a portion (right) of the mask corresponding to the port 1 in the mask information table 340-3 from "0" to "1". Furthermore, the port-to-port synchronization control unit 350-3 increments the counter in the mask information table 340-3 by "1". At this moment, the counter value becomes "1".

Then, the port-to-port synchronization control unit 350-3 determines whether a mask generation request has been received from all processes that participate in synchronization (Step S3). For example, the port-to-port synchronization control unit 350-3 obtains the number of processes "3" that participate in synchronization from the mask generation request received from the intra port synchronization block 300-1, and compares the obtained number with the counter value "1" in the mask information table 340-3 with each other. As a result of comparison, the number of processes "3" obtained from the mask generation request and the counter value "1" in the mask information table 340-3 do not match each other, and therefore it is determined that a mask generation request has not been received from all processes that participate in synchronization (No at Step S3). The port-to-port synchronization control unit 350-3 then returns to Step S1 described above, and waits for receiving the remaining mask generation requests.

Next, upon receiving the mask generation request from the intra port synchronization block 300-2 (Yes at Step S1), the port-to-port synchronization control unit 350-3 updates the mask and the counter in the mask information table 340-3 (Step S2). For example, when receiving a mask generation request from the intra port synchronization block 300-2, the port-to-port synchronization control unit 350-3 updates a portion (left) of the mask corresponding to the port 2 in the mask information table 340-3 from "0" to "1". Furthermore, the port-to-port synchronization control unit 350-3 increments the counter in the mask information table 340-3 by "1". At this moment, the counter value becomes "2".

Then, the port-to-port synchronization control unit 350-3 determines whether a mask generation request has been received from all processes that participate in synchronization (Step S3). For example, the port-to-port synchronization control unit 350-3 obtains the number of processes "3" that participate in synchronization from the mask generation request received from the intra port synchronization block 300-2, and compares the obtained number with the counter value "2" in the mask information table 340-3 with each other. As a result of comparison, the number of processes "3" obtained from the mask generation request and the counter value "1" in the mask information table 340-3 do not match each other, and therefore it is determined that a mask generation request has not been received from all processes that participate in synchronization (No at Step S3). The port-to-port synchronization control unit 350-3 then returns to Step S1 described above, and waits for receiving the remaining mask generation requests.

Next, upon receiving the mask generation request from the intra port synchronization block 300-1 (Yes at Step S1), the port-to-port synchronization control unit 350-3 updates the mask and the counter in the mask information table 340-3 (Step S2). For example, when receiving a mask generation request from the intra port synchronization block 300-1, the port-to-port synchronization control unit 350-3 updates a portion (right) of the mask corresponding to the port 1 in the mask information table 340-3 from "0" to "1". However, since the value of the mask has already been updated to "1", the value is left as it is. Furthermore, the port-to-port synchronization control unit 350-3 increments the counter in the mask information table 340-3 by "1". At this moment, the counter value becomes "3".

Then, the port-to-port synchronization control unit 350-3 determines whether a mask generation request has been received from all processes that participate in synchronization (Step S3). For example, the port-to-port synchronization control unit 350-3 obtains the number of processes "3" that participate in synchronization from the mask generation request received from the intra port synchronization block 300-1, and compares the obtained number with the counter value "3" in the mask information table 340-3 with each other. As a result of comparison, the number of processes "3" obtained from the mask generation request and the counter value "3" in the mask information table 340-3 match each other, and therefore it is determined that a mask generation request has been received from all processes that participate in synchronization (Yes at Step S3). Then, by referring to the mask in the mask information table 340-3, the port-to-port synchronization control unit 350-3 transmits a mask generation response indicating that mask generation has been completed to the intra port synchronization block 300-1 and the intra port synchronization block 300-2 (Step S4).

After transmitting the mask generation response, the port-to-port synchronization control unit 350-3 waits for receiving a synchronization request (Step S5). Upon receiving a synchronization request from the intra port synchronization block 300-2 (Yes at Step S5), the port-to-port synchronization control unit 350-3 updates the synchronization state in the mask information table 340-3 (Step S146). For example, when receiving a synchronization request from the intra port synchronization block 300-2, the port-to-port synchronization control unit 350-3 updates a portion (left) of the synchronization state corresponding to the port 2 in the mask information table 340-3 from "0" to "1".

After updating the synchronization state, the port-to-port synchronization control unit 350-3 determines whether port-to-port synchronization has been completed (Step S147). For example, the port-to-port synchronization control unit 350-3 compares the mask "11" and the synchronization state "10" in the mask information table 340-3 with each other. As a result of comparison, the mask "11" and the synchronization state "10" do not match each other, and therefore it is determined that port-to-port synchronization has not been completed (No at Step S147). The port-to-port synchronization control unit 350-3 then returns to Step S5 described above, and waits for receiving the remaining synchronization request from the intra port synchronization block 300-1 (port 1 side).

Upon receiving a synchronization request from the intra port synchronization block 300-1 (Yes at Step S5), the port-to-port synchronization control unit 350-3 updates the synchronization state in the mask information table 340-3 (Step S146). For example, when receiving a synchronization request from the intra port synchronization block 300-1, the port-to-port synchronization control unit 350-3 updates a portion (right) of the synchronization state corresponding to the port 1 in the mask information table 340-3 from "0" to "1".

After updating the synchronization state, the port-to-port synchronization control unit 350-3 determines whether port-to-port synchronization has been completed (Step S147). For example, the port-to-port synchronization control unit 350-3 compares the mask "11" and the synchronization state "11" in the mask information table 340-3 with each other. As a result of comparison, the mask "11" and the synchronization state "11" match each other, and therefore it is determined that port-to-port synchronization has been completed (Yes at Step S147). Then, by referring to the mask in the mask information table 340-3, the port-to-port synchronization control unit 350-3 transmits a synchronization response indicating that port-to-port synchronization has been completed to the intra port synchronization block 300-1 and the intra port synchronization block 300-2 (Step S8).

After transmitting the synchronization response, the port-to-port synchronization control unit 350-3 initializes the synchronization state (sets all values to "0") in the mask information table 340-3 (Step S9), and waits for a job completion notification from the intra port synchronization block 300-1 and the intra port synchronization block 300-2 (Step S10). Then, if a job completion notification has not been received from the intra port synchronization block 300-1 and the intra port synchronization block 300-2 (No at Step S10), the port-to-port synchronization control unit 350-3 returns to Step S5 described above to continue the process of synchronization-request port-to-port synchronization (Steps S5 to S9). Upon receiving a job completion notification from the intra port synchronization block 300-1 and the intra port synchronization block 300-2 (Yes at Step S10), the port-to-port synchronization control unit 350-3 ends the process, and initializes the mask in the mask information table 340-3.

As described above, according to the third embodiment, the details of the first embodiment can be similarly applied to port-to-port synchronization.

In the third embodiment, the case of participating in synchronization between two ports has been explained. However, even when the number of ports is extended, in view of the idea similar to that described above, the process can be performed similarly by adding a hierarchical layer to the port-to-port synchronization control unit 350-3.

While specific embodiments have been described, other embodiments or modifications are also possible. In the following, such modifications are explained.

For example, each component of the node-to-node synchronizing apparatus 300 depicted in FIG. 2 is functionally conceptual, and need not be physically configured as illustrated. In other words, the specific mode of dispersion and integration of the components of the node-to-node synchronizing apparatus 300 is not limited to those illustrated in the drawings. For example, the communication context table 330 and the mask information table 340 may be integrated together. In this manner, all or part of the components of the node-to-node synchronizing apparatus 300 may be divided or integrated either functionally or physically based on various types of loads or use conditions. Furthermore, all or any part of the processing functions performed by the node-to-node synchronizing apparatus 300 (see FIGS. 6 and 12 to 14) may be realized by a central processing unit (CPU) and a program analyzed and executed by the CPU, or may be realized as hardware by wired logic.

Figure 15:
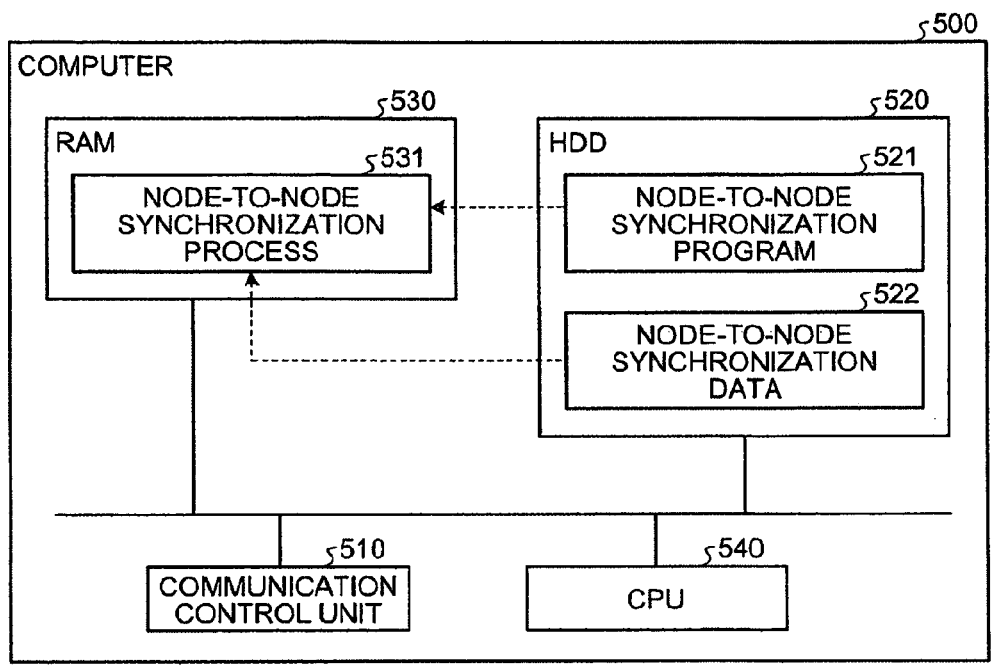
FIG. 15 is an example block diagram of a computer that executes a node-to-node synchronization program.
Figure 16:
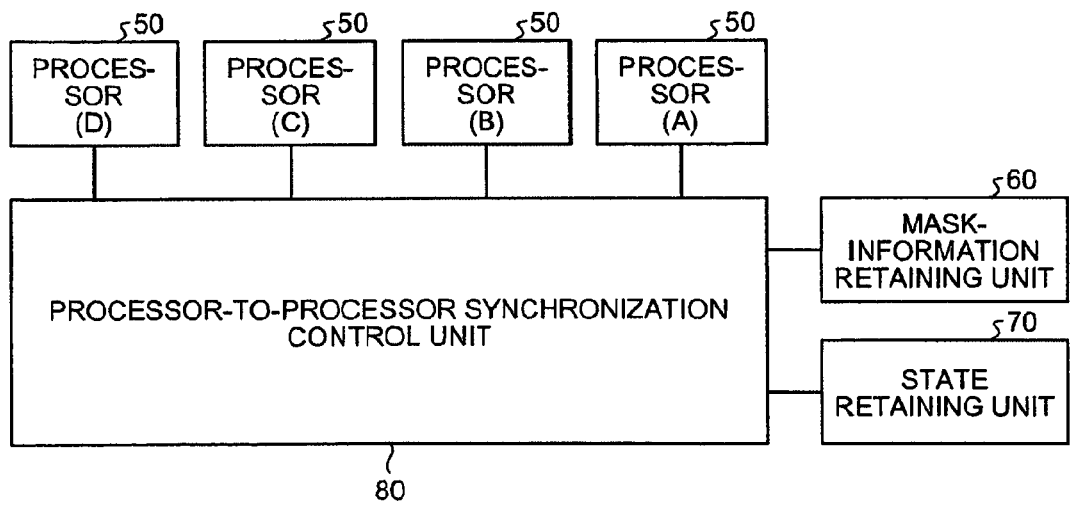
FIG. 16 is an example diagram for explaining a conventional technology.

Various processes of the node-to-node synchronizing apparatus 300 explained in the above embodiments may be implemented by executing a program (hereinafter, "node-to-node synchronization program") prepared in advance on a computer, such as a personal computer or work station. With reference to FIG. 15, an example of such a computer is explained that executes a node-to-node synchronization program for implementing the same function as described in the above embodiments. FIG. 15 is a block diagram of a computer 500 that executes a node-to-node synchronization program.

A communication control unit 510 controls communications regarding various information to be exchanged with another apparatus. A hard disk drive (HDD) 520 stores therein information required for performing various process by a CPU 540. A random access memory (RAM) 530 temporarily stores various information. The CPU 540 performs various computing operations.

The HDD 520 previously stores therein, as depicted in FIG. 15, a node-to-node synchronization program 521 that implements the same function as the node-to-node synchronizing apparatus 300 of the embodiments described above, and node-to-node synchronization data 522. The node-to-node synchronization program 521 may be distributed as appropriate and stored in a storage unit of another computer communicably connected via a network.

As the CPU 540 loads the node-to-node synchronization program 521 from the HDD 520 into the RAM 530, as depicted in FIG. 15, the node-to-node synchronization program 521 functions as a node-to-node synchronization process 531. That is, the node-to-node synchronization process 531 loads the node-to-node synchronization data 522 and others from the HDD 520 into an area assigned thereto in the RAM 530, and performs various processes based on the data. The node-to-node synchronization process 531 corresponds to that performed in, for example, the control unit 350 of the node-to-node synchronizing apparatus 300 depicted in FIG. 2.

The node-to-node synchronization program 521 need not necessarily be stored in the HDD 520 from the beginning. For example, the node-to-node synchronization program 521 may be stored in a "portable physical medium" connectable to the computer 500, such as a flexible disk (FD), compact-disk read only memory (CD-ROM), digital versatile disk (DVD), magneto-optical disk, or integrated circuit (IC) card. The node-to-node synchronization program 521 may also be stored in "another computer (or server)" connected to the computer 500 via a public line, the Internet, a local area network (LAN), or a wide area network (WAN), and be read by the computer 500 therefrom for execution.

With the node-to-node synchronizing apparatus 300 explained in the above embodiments, the following node-to-node synchronizing method is achieved.

That is, a node-to-node synchronizing method is achieved including an information generating step (Steps S1 to S3 in FIG. 6) of, before receiving a synchronization request for synchronization from each process in each computing node, receiving from each process that participates in synchronization a mask generation request for generating process location information indicating the location of each process that participates in synchronization, and automatically generating process location information by using each received mask generation request.

As set forth hereinabove, according to an embodiment, process location information can be automatically generated at low cost. Moreover, information about the location of processes for synchronization can be dynamically changed in a job.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A computer-to-computer synchronizing apparatus comprising:
 a memory that stores process location information and a counter value, the process location information indicating location of processes that participate in synchronization; and
 a processor that is coupled to the memory, and executes a process comprising:
  receiving a mask generation request from each process executed by each computer that includes a processor executing a process, the mask generation request including number of the processes that participate in the synchronization;
  updating the process location information by adding a location of a process of received mask generation request;
  incrementing the counter value by one every time the mask generation request is received;
  comparing the number of the processes included in the mask generation request and the counter value; and
  determining that generation of process location information has been completed when the number of the processes included in the mask generation request and the counter value match each other.

2. The computer-to-computer synchronizing apparatus according to claim 1, wherein, when a plurality of jobs are executed concurrently, for each job, different sets of processes participate in synchronization, and a set identifier that uniquely identifies each of the sets is included in the mask generation request and a synchronization request.

3. A computer-to-computer synchronizing method for controlling a computer-to-computer synchronizing apparatus including a memory that stores process location information and a counter value, the process location information indicating location of processes that participate in synchronization, and a processor that is coupled to the memory and executes a process, the computer-to-computer synchronizing method comprising:
 receiving a mask generation request from each process executed by each computer that includes a processor executing a process, the mask generation request requesting including number of the processes that participate in the synchronization;
 updating the process location information by adding a location of a process of received mask generation request;

incrementing the counter value by one every time the mask generation request is received;

comparing the number of the processes included in the mask generation request and the counter value; and determining that generation of process location information has been completed when the number of the processes included in the mask generation request and the counter value match each other.

4. A non-transitory computer readable storage medium storing a program for directing a computer-to-computer synchronizing apparatus to perform a process, the computer-to-computer synchronizing apparatus including a memory that stores process location information and a counter value, the process location information indicating location of processes that participate in synchronization, and a processor that is coupled to the memory and executes a process, the process comprising:

receiving a mask generation request from each process executed by each computer that includes a processor executing a process, the mask generation request requesting including number of the processes that participate in the synchronization;

updating the process location information by adding a location of a process of received mask generation request;

incrementing the counter value by one every time the mask generation request is received;

comparing the number of the processes included in the mask generation request and the counter value; and determining that generation of process location information has been completed when the number of the processes included in the mask generation request and the counter value match each other.

\* \* \* \* \*